Patented June 7, 1932

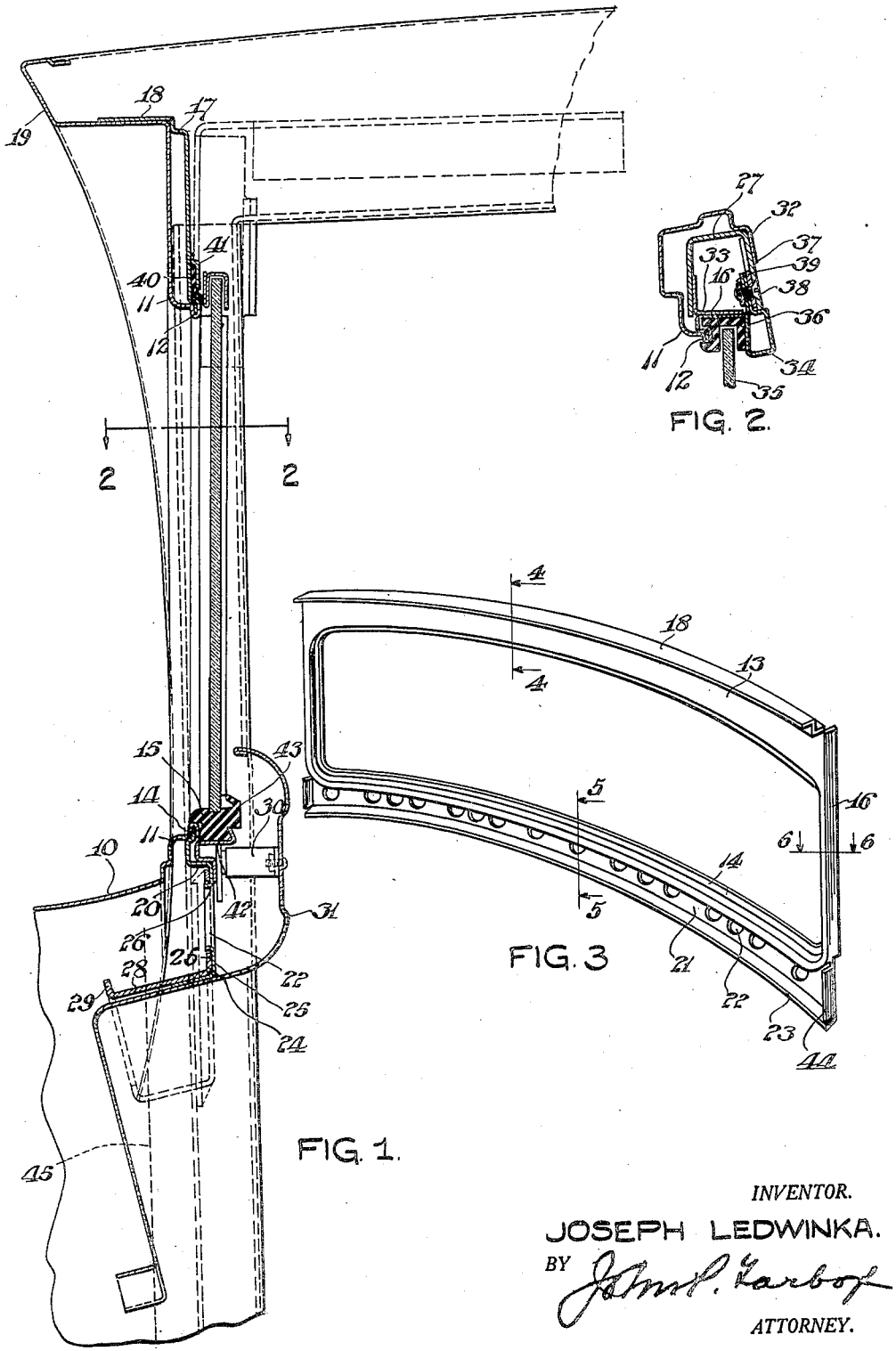

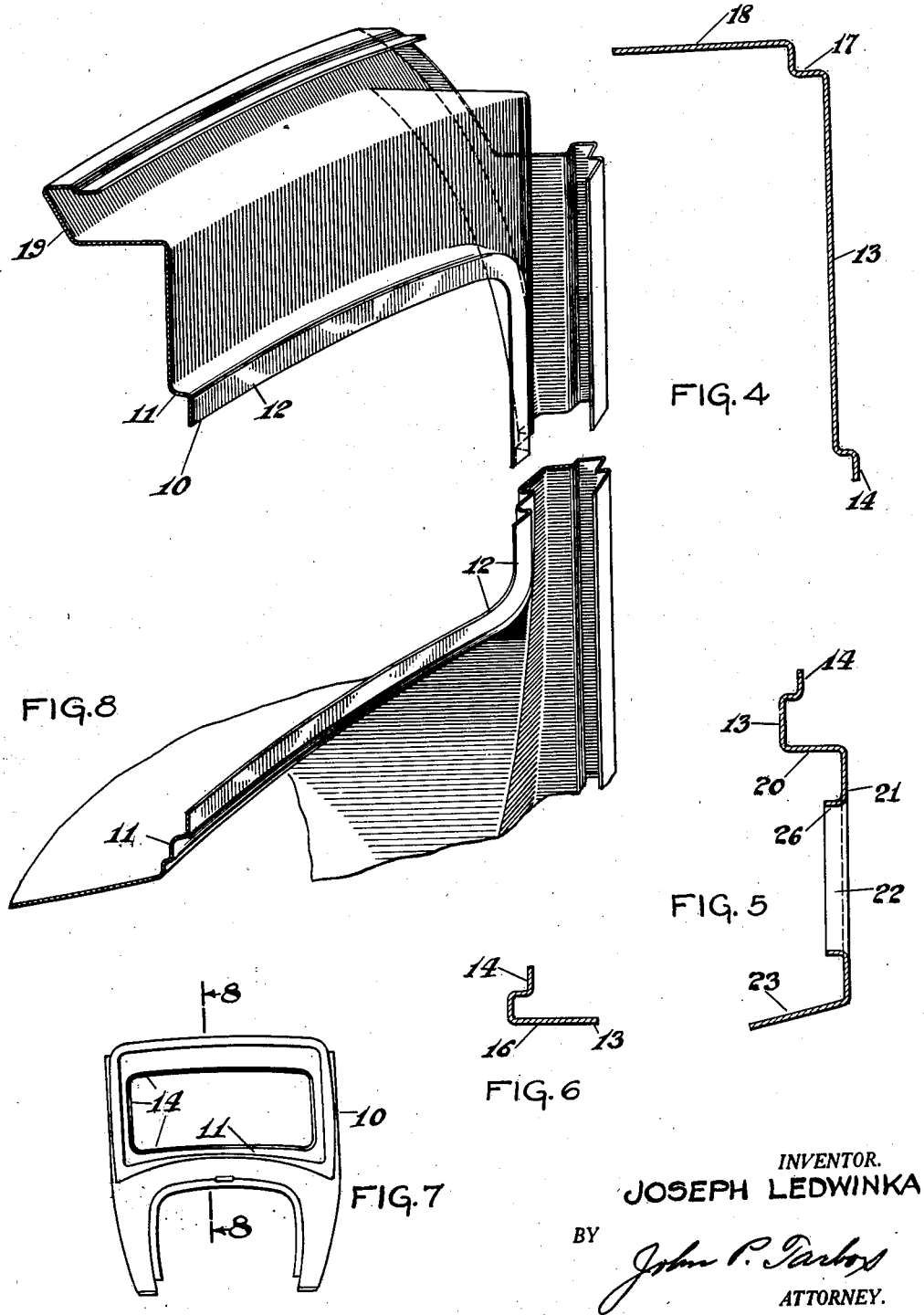

1,862,022

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY FRONT CONSTRUCTION

Application filed July 9, 1929. Serial No. 376,905.

The invention relates to windshield construction for vehicle bodies and more particularly to such a construction adapted to receive a vertically slidable windshield.

It is an object of the invention to provide a structure of this class which is simple in construction and can be readily formed of sheet metal, which can be built at low cost, which is applicable to various types of bodies, and which is light in weight and at the same time strong and durable. This object is in large part attained by providing a structure of this class in which the framework surrounding the windshield opening may be in the main built up of unitary outer and inner panels of relatively light gauge sheet metal extending entirely around the windshield opening. To further stiffen and strengthen the structure, such light gauge panels are reinforced and strengthened by an inner framework consisting of front post stampings at the sides, and an angular transverse member connecting the posts below the windshield opening.

One of the outstanding features of the invention is the novel inner panel construction whereby this panel forms portions of the glass run channels at the sides and is formed with lateral flanges for connection to the posts and provided with a downward extension at the bottom provided with ventilating openings therein and above said openings with a transverse offset forming a seat for a weather strip supporting and securing member. This panel is flanged at top and bottom for securement to the outer panel to form a hollow box section top header for the windshield and at the bottom to secure it to an arm of the transverse frame member which is provided with ventilating opening corresponding to the openings in the panel.

Other and further objects and advantages of the invention and the structural features through which they are attained will become apparent from the following detailed description when read in connection with the accompanying drawings forming a part hereof.

In the drawings:

Fig. 1 is a vertical longitudinal sectional view through the windshield structure and portion of the cowl of a body front embodying the invention.

Fig. 2 is a transverse sectional view through the front post structure at the side of the windshield opening taken substantially on the line 2—2 of Fig. 1.

Fig. 3 is a perspective view of the novel unitary inner panel stamping.

Figs. 4, 5 and 6 are detail sectional views taken respectively on the correspondingly numbered lines of Fig. 3.

Fig. 7 is a front elevational view on a reduced scale of the front unitary outer panel stamping, and Fig. 8 is an inside perspective view of one-half of said front stamping taken approximately on the line 8—8 of Fig. 7.

According to the embodiment of my invention shown in the drawings, the windshield opening is surrounded by an outer panel 10 which may and preferably is, a unitary stamping of light gauge pressed metal formed with a continuous beading 11 around the windshield opening, and an edge flange 12 adapted to be crimped over an edge flange on the inner panel to form thereby garnish for the outer side of the windshield opening. The inner panel stamping 13 is formed around the windshield opening with an inwardly offset flange 14 which cooperates as shown, with the crimped over outer panel flange 12 to form a locked crimped joinder between these parts in the edge of the window opening. This inner panel flange 14 and the outer panel flange crimped over it forms a reinforced outer side wall for the glass run channel at the bottom and sides of the window opening. Both at the bottom and sides, it forms a part of the means for retaining in place the usual weather strip, as 15 and 36.

At the sides of the windshield opening the inner panel is laterally flanged as at 16, to form the bottoms of the glass run channel and means for connecting it to the front posts. At the top the inner panel stamping is extended upwardly some distance, is offset forwardly, as at 17, to seat against the outer panel, and is then formed with a forwardly extending edge flange 18 which overlaps the lower wall of the rearwardly facing channel peak panel portion 19 of the outer panel, and is secured thereto, as by spot welding, thus forming a box section top header of a vertical extent approximately equal to the vertically sliding movement of the windshield and arranged entirely forward of the plane of the windshield and forming the front wall of the pocket receiving the upper portion of the same.

At the bottom the inner panel stamping is formed with an inward offset forming a shoulder 20, and is then extended downwardly by an extension 21 provided with the ventilator openings 22, it lower edge being provided with a forwardly extending flange 23, for securement to the transverse frame member 24, as by spot welding.

This frame member 24 has a vertically extending arm 25 seated against the downward extension 21 of the inner panel which is provided with ventilating openings corresponding to the ventilating openings 22 in the panel stamping, and the latter is provided with edge flanges 26 around the ventilating openings which extend into the openings in the frame member, see Fig. 1. The vertical arm 25 of the frame member 24 is offset forwardly at the sides and secured to the front posts 27. Between the posts the member 24 is formed with a forwardly and downwardly extending arm 28 to which the edge flange 23 of the inner panel is secured. This arm is flanged upwardly along its forward edge, as at 29.

To the rear of the downwardly extending portion 21 of the inner panel 13 are secured suitable adjustable brackets as 30, which support the upper transverse portion of the combined interior finish panel, baffle plate, and instrument board 31, a forwardly extending portion of which underlies the transversely extending forwardly extending arm 28 of the transverse frame member 24. At the sides the combined baffle plate and instrument board is secured to the front post in any well-known manner (not herein shown). The front posts 27 are inwardly facing channel stampings nested with the angular formation 32 at the rear edge of the outer panel 10 and secured thereto as by spot welding. Brackets as 33 extending across the open mouth of the channel of the post provide means through which the flanges 16 on the inner panel are secured to the posts as by spot welding. Any suitable means (not shown) may be provided at the top of the windshield opening for raising and lowering the windshield.

At the sides, removable metal trim strips 34 of the form shown in Fig. 2, form the inside wall of the glass run and retain the windshield panel 35 and the channel weather strips and guides 36 in place. These straps have inwardly extending attaching flanges 37, which overlap the inside of the rear wall of the posts to which they are secured by screws 38 and tapping blocks 39.

At the top the weather strip 40 is seated in the angle formed by the offset edge flange of the inner panel 13 and is secured in place by a metal strip 41 secured to the inner panel 13.

At the bottom the shoulder 20 formed by the offset in the inner panel provides a seat for an angular metal retaining strip 42 which forms with the clinched joint between the outside and inside panels a retaining channel for the lower windshield weather strip 43.

Below the windshield opening the inner panel stamping is further formed with forwardly directed flanges 44 which may serve as means for further connecting the inner panel to the posts to a forwardly extending flange 45 indicated by the dotted lines of Fig. 1, formed on the post in that region.

From the foregoing description of the structure of the improved windshield construction, it will be seen that I have provided a very simple construction and one which is well adapted for use with the vertically slidable type of windshield, but it will be understood that certain features thereof may also be applicable to other types of windshields, and that the structure may be varied within the knowledge of those skilled in the art, without departing from the spirit and scope of the invention as expressed in the appended claims.

What I claim is:

1. Vehicle body front in which the windshield opening is formed by inner and outer stampings extending entirely around said opening, and joined together in the opening, the inner panel being formed at its sides to provide the outer side and bottom of a glass run channel, and further having a downward extension closing the space between the windshield opening and a baffle plate, said downward extension being provided with ventilating openings.

2. Vehicle body front in which the windshield opening is formed by inner and outer stampings extended entirely around said opening, and joined together in the opening, the inner panel being formed in the sides with angular flanges forming the bottom and a side of a glass run channel, and at the top forming a cross member arranged entirely forward of the plane of the windshield and secured to the outer panel in its margin.

3. An inner panel unit for use in vehicle body fronts comprising a unitary stamping extending entirely around the window opening and provided with an angular seat at its sides to receive the edge of the windshield, with an upward extension at the top provided with forward extending attaching flange for joinder to an outer panel, and with a downward extension having ventilator openings therein and provided at the bottom with a forwardly extending attaching flange.

4. An inner panel stamping extending entirely around the windshield opening, and extended upwardly at the top in a plane forwardly of the plane of the windshield, and provided with angular formations at the sides, one arm of said angular portions being adapted at the sides to be secured to the post structures, and at the bottom being formed with a downward extension extending across the space between a baffle plate and the windshield opening, said extension being provided with ventilator openings.

5. In a windshield construction, front posts at the sides of the windshield, an inner panel extending entirely around the windshield opening and formed of angular shape at the sides of said opening to provide the bottom and outer side of the glass run channel at the sides, and secured to said posts through the bottoms of said glass run channels.

6. In a windshield construction, front posts at the sides of the windshield, an inner panel forming at sides the outer side and bottom of a glass run channel and secured in the windshield opening to an outer panel forming the outer moulding around the windshield opening, removable moulding strips forming the inner sides of the glass run channel at the sides of the opening, and secured to said posts.

7. In a windshield construction, an inner panel extending entirely around the windshield opening and formed at the sides and bottom of the windshield opening with an inwardly presenting angle section portion, and an outwardly facing angle strip secured to the horizontal arm of the inwardly presenting angle section portion at the bottom of the opening to form with other arm of said angle section portion a weather strip retaining channel.

8. In a front construction for vehicle bodies, front posts, a frame member joining said front posts below the windshield opening and having a vertically extending portion and a forwardly extending portion at the bottom of said vertically extending portion, said vertically extending portion being provided with ventilator openings and an inner panel covering said member and having corresponding openings provided with edge flanges extending into the openings of the frame member.

In testimony whereof I hereunto affix my signature.

JOSEPH LEDWINKA.